US011236192B2

(12) United States Patent
Okada et al.

(10) Patent No.: US 11,236,192 B2
(45) Date of Patent: Feb. 1, 2022

(54) FLAME-RETARDANT RIGID POLYURETHANE FOAM

(71) Applicant: SEKISUI CHEMICAL CO., LTD., Osaka (JP)

(72) Inventors: Kazuhiro Okada, Osaka (JP); Tomonori Kajita, Saitama (JP); Yozo Toei, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/756,211

(22) PCT Filed: Sep. 30, 2016

(86) PCT No.: PCT/JP2016/079004
§ 371 (c)(1),
(2) Date: Feb. 28, 2018

(87) PCT Pub. No.: WO2017/057670
PCT Pub. Date: Apr. 6, 2017

(65) Prior Publication Data
US 2018/0265620 A1  Sep. 20, 2018

(30) Foreign Application Priority Data

Sep. 30, 2015 (JP) .............................. JP2015-194241

(51) Int. Cl.
| | |
|---|---|
| *C08G 18/09* | (2006.01) |
| *C08G 18/16* | (2006.01) |
| *C08G 18/18* | (2006.01) |
| *C08G 18/20* | (2006.01) |
| *C08G 18/22* | (2006.01) |
| *C08G 18/42* | (2006.01) |
| *C08G 18/76* | (2006.01) |
| *C08J 9/00* | (2006.01) |
| *C08J 9/14* | (2006.01) |
| *C08K 3/016* | (2018.01) |
| *C08K 3/02* | (2006.01) |
| *C08K 3/22* | (2006.01) |
| *C08K 5/521* | (2006.01) |

(52) U.S. Cl.
CPC ........... *C08G 18/18* (2013.01); *C08G 18/092* (2013.01); *C08G 18/163* (2013.01); *C08G 18/1808* (2013.01); *C08G 18/1875* (2013.01); *C08G 18/2027* (2013.01); *C08G 18/2063* (2013.01); *C08G 18/225* (2013.01); *C08G 18/4208* (2013.01); *C08G 18/7671* (2013.01); *C08J 9/0019* (2013.01); *C08J 9/0038* (2013.01); *C08J 9/0066* (2013.01); *C08K 3/016* (2018.01); *C08K 3/02* (2013.01); *C08K 3/22* (2013.01); *C08K 5/521* (2013.01); *C08G 2110/0025* (2021.01); *C08J 9/0028* (2013.01); *C08J 9/0047* (2013.01); *C08J 9/0052* (2013.01); *C08J 9/0061* (2013.01); *C08J 9/146* (2013.01); *C08J 2205/10* (2013.01); *C08J 2371/02* (2013.01); *C08J 2375/04* (2013.01); *C08J 2383/04* (2013.01); *C08K 2003/026* (2013.01)

(58) Field of Classification Search
CPC ...... C08J 9/0019; C08J 9/0028; C08J 9/0038; C08J 9/0047; C08K 3/016; C08G 18/092; C08G 18/163; C08G 18/18; C08G 18/1808; C08G 18/2027; C08G 18/206; C08G 18/03; C08G 18/2225; C08G 18/4208; C08G 18/7671; C08G 18/2063
See application file for complete search history.

(56) References Cited

U.S. PATENT DOCUMENTS

| | | | | |
|---|---|---|---|---|
| 6,211,257 B1* | 4/2001 | Kaplan | ............... | C08G 18/4018 521/125 |
| 2009/0105359 A1* | 4/2009 | O'Connor | .......... | C08G 18/4841 521/137 |
| 2010/0087560 A1* | 4/2010 | Crain | ................... | C08G 18/092 521/155 |
| 2011/0046251 A1 | 2/2011 | Wada et al. | | |

(Continued)

FOREIGN PATENT DOCUMENTS

| | | |
|---|---|---|
| CN | 104854156 | 8/2015 |
| EP | 1 770 118 | 4/2007 |

(Continued)

OTHER PUBLICATIONS

International Search Report dated Dec. 20, 2016 in International (PCT) Application No. PCT/JP2016/079004.

(Continued)

Primary Examiner — Melissa A Rioja
(74) Attorney, Agent, or Firm — Wenderoth, Lind & Ponack, L.L.P.

(57) ABSTRACT

A flame-retardant rigid polyurethane foam contains a flame retardant, the foam having a ratio of the maximum peak intensity ratio (P1) of the foam after moist heat treatment of the foam for one week at a temperature of 80° C. and a humidity of 85% to the maximum peak intensity ratio (P2) of the foam before this moist heat treatment of 85% or more (P1/P2×100). The P1 and P2 each refer to the ratio of the maximum peak intensity of 1390 to 1430 $cm^{-1}$ to the maximum peak intensity of 1500 to 1520 $cm^{-1}$ when the infrared absorption spectrum is measured at a position 5 to 10 mm from the surface of the foam, and the average intensity of 1900 to 2000 $cm^{-1}$ is adjusted to zero.

10 Claims, No Drawings

(56) References Cited

U.S. PATENT DOCUMENTS

| | | | | |
|---|---|---|---|---|
| 2014/0066532 | A1* | 3/2014 | Combs | C08G 18/163 521/103 |
| 2014/0094530 | A1* | 4/2014 | Combs | C08G 18/7664 521/107 |
| 2014/0171527 | A1* | 6/2014 | Yu | C08J 9/02 521/121 |
| 2014/0303271 | A1* | 10/2014 | Gelmont | C09K 21/14 521/170 |
| 2015/0322195 | A1 | 11/2015 | Makida et al. | |
| 2016/0251491 | A1 | 9/2016 | Okada et al. | |

FOREIGN PATENT DOCUMENTS

| | | |
|---|---|---|
| EP | 3 199 590 | 8/2017 |
| JP | 2000-169542 | 6/2000 |
| JP | 2001-310925 | 11/2001 |
| JP | 2004-59900 | 2/2004 |
| JP | 2004-155856 | 6/2004 |
| JP | 2005-126695 | 5/2005 |
| JP | 2007-099822 | 4/2007 |
| JP | 2009-138134 | 6/2009 |
| JP | 2010-53267 | 3/2010 |
| JP | 2012-177109 | 9/2012 |
| JP | 2013-103957 | 5/2013 |
| JP | 2014-196476 | 10/2014 |
| JP | 2015/004928 | 1/2015 |
| JP | 2015-078357 | 4/2015 |
| JP | 2015-131883 | 7/2015 |
| JP | 2015-151469 | 8/2015 |
| WO | 2008/144158 | 11/2008 |
| WO | 2009/145236 | 12/2009 |
| WO | 2014/055318 | 4/2014 |
| WO | 2014/112394 | 7/2014 |
| WO | 2014/133986 | 9/2014 |
| WO | 2015/119949 | 8/2015 |
| WO | 2015/129850 | 9/2015 |
| WO | 2016/017797 | 7/2016 |

OTHER PUBLICATIONS

Communication pursuant to Article 94(3) EPC dated Mar. 31, 2020 in corresponding European Patent Application No. 16851839.7.
Notice of Reasons for Refusal dated Apr. 6, 2020 in corresponding Japanese Patent Application No. 2016-562281 with Machine translation.
Office Action dated Apr. 7, 2020 in corresponding Chinese Patent Application No. 201680058401.X, with Machine translation.
Notice of Reasons for Refusal dated Sep. 1, 2020 in corresponding Japanese Patent Application No. 2016-562281 with Machine translation.
Communication pursuant to Article 94(3) EPC dated Dec. 8, 2020, in corresponding European Patent Application No. 16851839.7.
Notice of Reasons for Refusal dated Oct. 5, 2021 in corresponding Japanese Patent Application No. 2020-199287 with Machine translation.

* cited by examiner

FLAME-RETARDANT RIGID POLYURETHANE FOAM

CROSS REFERENCE TO RELATED APPLICATION

This application claims priority to Japan Patent Application No. 2015-194241, filed on Sep. 30, 2015, the disclosure of which is incorporated herein by reference in its entirety.

TECHNICAL FIELD

The present invention relates to flame-retardant rigid polyurethane foams.

BACKGROUND ART

Foamed polyurethane resins have been used as heat-insulating materials for buildings, such as housing complexes including condominium apartments, houses, school facilities, and commercial buildings. However, urethane resin is known to have a low flame retardancy level, and heat-insulating urethane materials with flame retardancy have been sought. Additionally, the heat and humidity resistance of flame retardancy, i.e, the property of withstanding a high humidity and a high temperature to maintain flame retardancy, is desired for long-term guaranty.

As an approach to improve the humidity resistance of flame-retardant polyurethane resin compositions, PTL 1, for example, discloses a flame-retardant polyurethane resin composition comprising a polyurethane obtained by reacting a polyol composed of at least one component having an average content of oxygen atoms of 20 wt % or less with a polyisocyanate having such a weight, based on the polyol, that the NCO/OH index determined from the ratio of the number of isocyanate groups to the number of hydroxyl groups of the polyol falls within the range of 200 or more and 2,000 or less, using a metal-based isocyanurate-forming catalyst in an amount of 0.5 parts by weight or more and 20 parts by weight or less per 100 parts by weight of the polyol.

PTL 2 discloses a rigid polyurethane foam obtained by mixing a polyisocyanate component with a mixture liquid of a polyol component, a foaming agent, a catalyst, and other auxiliaries; and foaming the mixture. PTL 2 also discloses the use of water as the foaming agent and that the rigid polyurethane foam contains an imidazole-based compound as the catalyst. The content of the imidazole-based compound relative to water in the mixture liquid is 0.05 to 5.0 on a weight basis.

PTL 3 discloses a polyurethane resin composition (X) that comprises a hydroxyl group-containing compound, an isocyanate group-containing compound, and a metal hydroxide (C). The hydroxyl group-containing compound contains a polybutadiene polyol (A) and a castor oil-based polyol (B). The metal hydroxide is present in an amount of 55 to 80 parts by mass per 100 parts by mass of the polyurethane resin composition (X). The mass ratio of the castor oil-based polyol (B) to the metal hydroxide (C) ((B):(C)) is 1:5 to 1:10.

CITATION LIST

Patent Literature

PTL 1: JP2000-169542A
PTL 2: JP2004-059900A
PTL 3: JP2015-131883A

SUMMARY OF INVENTION

Technical Problem

PTL 1 uses a polyol composed of at least one component having an average oxygen atom content of 20 wt % or less to decrease the hydrophilicity of the obtained polyurethane resin composition, and thereby improve its humidity resistance.

PTL 2 uses a predetermined amount of an imidazole-based compound as a catalyst to suppress the hydrolysis of a polyester polyol when using water as a foaming agent, and thereby increases the storage stability of the mixture liquid.

In PTL 3, the thermal durability is increased because the isocyanate group-containing compound contains an isocyanurate variant.

However, none of PTL 1 to 3 teaches that a polyurethane foam exhibits improved humidity resistance while satisfying the flame retardancy stipulated in the Building Standards Act.

PTL 1, PTL 2, and PTL 3 improve the humidity resistance using, respectively, a specific polyol, a predetermined amount of an imidazole-based compound as a catalyst, and an isocyanate containing an isocyanurate variant. Their components for use in improving the humidity resistance are different, and PTL 1 to 3 do not necessarily evaluate the heat and humidity resistance of the flame retardancy of polyurethane foams using a common index.

A purpose of the present invention is to provide a flame-retardant rigid polyurethane foam that exhibits improved heat and humidity resistance of flame retardancy.

Solution to Problem

The present inventors conducted extensive research to achieve the object, and found that decreases in flame retardancy caused by heat and humidity is attributed to the decomposition of isocyanurate groups by water. The inventors then completed the invention.

Specifically, in an embodiment of the present invention, provided is a flame-retardant rigid polyurethane foam comprising a flame retardant, the foam having a ratio of the maximum peak intensity ratio (P1) after moist heat treatment of the foam for one week at a temperature of 80° C. and a humidity of 85% to the maximum peak intensity ratio (P2) of the foam before this moist heat treatment of 85% or more (P1/P2×100).

The P1 and P2 each refer to the ratio of the maximum peak intensity of 1390 to 1430 $cm^{-1}$ to the maximum peak intensity of 1500 to 1520 $cm^{-1}$ when an infrared absorption spectrum is measured at a position 5 to 10 mm from the surface of the foam, and the average intensity of 1900 to 2000 $cm^{-1}$ is adjusted to zero.

Advantageous Effects of Invention

The flame-retardant rigid polyurethane foam of the present invention has a property of withstanding a high humidity and a high temperature to maintain the flame retardancy.

DESCRIPTION OF EMBODIMENTS

The present invention encompasses flame-retardant rigid polyurethane foams that comprise a flame retardant, the foams having a ratio of the maximum peak intensity ratio (P1) after moist heat treatment of the foam for one week at a temperature of 80° C. and a humidity of 85% to the maximum peak intensity ratio (P2) of the foam before this moist heat treatment of 85% or more (P1/P2×100).

The "P1 and P2" each refer to a ratio of the maximum peak intensity of 1390 to 1430 cm$^{-1}$ to the maximum peak intensity of 1500 to 1520 cm$^{-1}$ when an infrared absorption spectrum is measured at a position 5 to 10 mm from the surface of the foam, and the average intensity of 1900 to 2000 cm$^{-1}$ is adjusted to zero.

The above ratio is a percentage of the maximum peak intensity of 1390 to 1430 cm$^{-1}$ after 1 week of a moist heat treatment at a temperature of 80° C. and a humidity of 85% to the maximum peak intensity before the moist heat treatment, when the average intensity of 1900 to 2000 cm$^{-1}$ is adjusted to zero, and the maximum peak intensity of 1500 to 1520 cm$^{-1}$ is taken as 1.

The flame-retardant rigid polyurethane foam of the present invention can be obtained by foaming and curing a foamable polyurethane resin composition. The components of the foamable polyurethane resin composition are described below.

The foamable polyurethane resin composition contains a polyol, an aromatic polyisocyanate, a foam stabilizer, a catalyst, a foaming agent, a flame retardant, and other optional components. An aromatic polyisocyanate as the main component of urethane resin and a polyol as a curing agent of urethane resin are cured through a chemical reaction to form urethane resin. The following describes each component.

1. Aromatic Polyisocyanate

Examples of aromatic polyisocyanates as the main component of urethane resin include phenylene diisocyanate, tolylene diisocyanate, xylylene diisocyanate, diphenylmethane diisocyanate, dimethyl diphenylmethane diisocyanate, triphenylmethane triisocyanate, naphthalene diisocyanate, and polymethylene polyphenyl polyisocyanate.

These aromatic polyisocyanates can be used singly, or in a combination of two or more. For ease of use, ease of availability, etc., the main component of urethane resin is preferably diphenylmethane diisocyanate.

2. Polyol

Examples of polyols as a curing agent for urethane resin include polylactone polyols, polycarbonate polyols, aromatic polyols, alicyclic polyols, aliphatic polyols, polyester polyols, polymeric polyols, and polyether polyols.

Examples of polylactone polyols include polypropiolactone glycol, polycaprolactone glycol, and polyvalerolactone glycol.

Examples of polycarbonate polyols include polyols obtained by dealcoholization reaction of a hydroxyl-containing compound, such as ethylene glycol, propylene glycol, butanediol, pentanediol, hexanediol, octanediol, or nonanediol, with a dialkylene carbonate, such as diethylene carbonate or dipropylene carbonate.

Examples of aromatic polyols include bisphenol bisphenol F, phenol novolac, and cresol novolac.

Examples of alicyclic polyols include cyclohexane diol, methylcyclohexane diol, isophorone diol, dicyclohexylmethane diol, and dimethyldicyclohexylmethane diol.

Examples of aliphatic polyols include ethylene glycol, propylene glycol, butanediol, pentanediol, and hexanediol.

Examples of polyester polyols include polymers obtained by dehydration condensation of a polybasic acid with a polyhydric alcohol; polymers obtained by ring-opening polymerization of a lactone, such as ε-caprolactone or α-methyl-ε-caprolactone; and condensation products of hydroxy carboxylic acids with the polyhydric alcohols mentioned above.

Specific examples of polybasic acids as used herein include adipic acid, azelaic acid, sebacic acid, terephthalic acid, isophthalic acid, and succinic acid. Specific examples of polyhydric alcohols include bisphenol A, ethylene glycol, 1,2-propylene glycol, 1,4-butanediol, diethylene glycol, 1,6-hexane glycol, and neopentyl glycol.

Specific examples of hydroxy carboxylic acids include castor oil, and reaction products of castor oil with ethylene glycol.

Examples of polymeric polyols include polymers obtained by graft polymerization of aromatic polyols, alicyclic polyols, aliphatic polyols, polyester polyols, or the like with ethylenically unsaturated compounds, such as acrylonitrile, styrene, methylacrylate, and methacrylate; polybutadiene polyol; modified polyols of polyhydric alcohols; and hydrogenated products thereof.

Examples of modified polyols of polyhydric alcohols include those obtained by reacting a polyhydric alcohol used as a starting material with an alkylene oxide to modify the alcohol.

Examples of polyhydric alcohols include trihydric alcohols, such as glycerin and trimethylolpropane; tetra- to octahydric alcohols, such as pentaerythritol, sorbitol, mannitol, sorbitan, diglycerol, dipentaerythritol, sucrose, glucose, mannose, fructose, methyl glucoside, and derivatives thereof; phenol such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyols; castor oil polyols; multi-functional polyols (e.g., 2 to 100 functional groups), such as (co)polymers of hydroxyalkyl(meth)acrylate and polyvinyl alcohols; and condensation products (novolak) of phenol with formaldehyde.

The method for modifying a polyhydric alcohol is not particularly limited. As such a method, a method for adding alkylene oxide ("AO") to a polyhydric alcohol is preferably used.

Examples of AO include AO having 2 to 6 carbon atoms, such as ethylene oxide ("EO"), 1,2-propylene oxide ("PO"), 1,3-propylene oxide, 1,2-butylene oxide, and 1,4-butylene oxide.

Of these, PO, EO, and 1,2-butylene oxide are preferable, and PO and EO are more preferable, from the standpoint of their characteristics and reactivity. When two or more types of AOs (e.g., PO and EO) are used, they may be added by block addition, random addition, or a combination thereof.

Examples of polyether polyols include polymers obtained by subjecting at least one member of alkylene oxides, such as ethylene oxide, propylene oxide, and tetrahydrofuran, to ring-opening polymerization in the presence of at least one member of, for example, low-molecular-weight active hydrogen compounds having two or more active hydrogen atoms.

Examples of low-molecular-weight active hydrogen compounds having two or more active hydrogen atoms include diols, such as bisphenol A, ethylene glycol, propylene glycol, butylene glycol, and 1,6-hexanediol; triols, such as glycerin and trimethylolpropane; and amines, such as ethylenediamine and butylenediamine.

The polyol used in the present invention is preferably a polyester polyol or a polyether polyol because they greatly contribute to the reduction of the gross calorific value at the time of combustion.

Of these, a polyester polyol having a molecular weight of 200 to 800 is more preferable for use, and a polyester polyol having a molecular weight of 300 to 500 is even more preferable for use.

An isocyanate index is the percentage of the equivalent ratio of isocyanate groups in the polyisocyanate to hydroxyl groups in the polyol. A value exceeding 100 means that the amount of isocyanate groups is greater than the amount of hydroxyl groups.

The isocyanate index of the urethane resin used in the present invention is not particularly limited, but is preferably within the range of 150 to 1000, more preferably 200 to 800, and even more preferably 250 to 700. The isocyanate index (INDEX) is calculated using the following equations.

INDEX=(number of equivalents of isocyanate)/
(number of equivalents of polyol+number of
equivalents of water)×100

Number of equivalents of isocyanate=molecular
weight of NCO/NCO content (%)×100

Number of equivalents of polyol=OHV×number of
parts added/molecular weight of KOH wherein OHV is the hydroxy value of polyol (mg KOH/g)

Number of equivalents of water=number of parts
added/molecular weight of water×number of
OH groups in water In the above formulas, the molecular weight of NCO is 42, the molecular weight of KOH is 56100, the molecular weight of water is 18, and the number of OH groups is 2

3. Foam Stabilizer

Examples of foam stabilizers include surfactants, such as polyoxyalkylene foam stabilizers including polyoxyalkylene alkyl ether, and silicone foam stabilizers including organopolysiloxane.

The amount of the foam stabilizer added is suitably determined depending on the urethane resin, and the amount is, for example, preferably 0.1 to 10 parts by weight per 100 parts by weight of the urethane resin.

The foam stabilizers can be used singly, or in a combination of two or more.

4. Catalyst

Examples of the catalyst include trimerization catalysts.

A trimerization catalyst reacts with isocyanate groups of aromatic polyisocyanate, i.e., the main component of polyurethane resin, to achieve trimerization of the isocyanates, leading to the formation of isocyanurate rings.

Examples of trimerization catalysts used to facilitate the formation of isocyanurate rings include nitrogen-containing aromatic compounds, such as tris(dimethylaminomethyl) phenol, 2,4-bis(dimethylaminomethyl)phenol, and 2,4,6-tris(dialkylaminoalkyl)hexahydro-S-triazine; carboxylic acid alkali metal salts, such as potassium acetate, potassium 2-ethylhexanoate, and potassium octylate; tertiary ammonium salts, such as trimethyl ammonium salt, triethyl ammonium salt, and triphenyl ammonium salt; and quaternary ammonium salts, such as tetramethyl ammonium salt, tetraethyl ammonium salt, and tetraphenyl ammonium salt.

The amount of the trimerization catalyst is preferably 0.6 to 10 parts by weight, more preferably 0.6 to 8 parts by weight, even more preferably 0.6 to 6 parts by weight, and most preferably 0.6 to 3 parts by weight, per 100 parts by weight of the urethane resin. The trimerization catalyst in an amount of 0.6 parts by weight or more does not prevent the trimerization of the aromatic polyisocyanate, and the trimerization catalyst in an amount of 10 parts by weight or less can maintain a suitable foaming rate, thereby enabling easy handling.

Examples of catalysts other than the trimerization catalysts include the following resinifying or foaming catalysts: amines, such as alkylated polyalkylene polyamine, triethylamine, triethylene diamine, N,N,N',N'-tetramethyl hexamethylenediamine, N'',N''-pentamethyldiethylenetriamine, N,N,N'-trimethyl aminoethyl-ethanolamine, triethylene diamine-bis(2-dimethylaminoethyl) ether, and urethane catalysts; and nitrogen atom-containing catalysts, such as N-methyl morpholine bis(2-dimethylaminoethyl) ether, N,N,N'-bis(2-dimethylaminoethyl) ether, N-methyl, N'-dimethylaminoethyl piperazine, and imidazole compounds in which the secondary amine functional group in the imidazole ring has been replaced by a cyanoethyl group.

When the catalyst other than the trimerization catalyst is contained in the foamable polyurethane resin composition, the total amount of the trimerization catalyst and the catalyst other than the trimerization catalyst is preferably 0.6 to 10 parts by weight, more preferably 0.6 to 8 parts by weight, even more preferably 0.6 to 6 parts by weight, and most preferably 0.6 to 3 parts by weight, per 100 parts by weight of the urethane resin.

A total amount of 0.6 parts by weight or more does not impede the urethane bond formation, while a total amount of 10 parts by weight or less maintains a suitable foaming rate, enabling easy handling.

While not wishing to be bound by theory, the present inventors found that the use of an amine as a catalyst facilitates the decomposition of isocyanurate groups by water. Thus, it is preferable in the present invention that the amount of an amine of the catalyst other than the trimerization catalyst is small, and particularly more preferable that the amount of a tertiary amine is small. The tertiary amine also includes imidazole compounds in which the secondary amine functional group in the imidazole ring has been replaced by a substituted hydrocarbon group such as a cyanoethyl group, or replaced by a non-substituted hydrocarbon group.

The amount of the tertiary amine added as the catalyst other than the trimerization catalyst is preferably 3 parts by weight or less, and more preferably 2.9 parts by weight or less, per 100 parts by weight of the urethane resin. The lower limit of the amount of the tertiary amine added as the catalyst other than the trimerization catalyst is not particularly limited, but is preferably 0 parts by weight or more, preferably 0.1 parts by weight or more, and more preferably 0.2 parts by weight or more, per 100 parts by weight of the urethane resin.

Other preferable examples of the catalyst other than the trimerization catalyst include 1,2-dimethylimidazole.

In an embodiment, the foamable polyurethane resin composition does not contain an amine as a catalyst. In another embodiment, the foamable polyurethane resin composition does not contain a tertiary amine as a catalyst. In another embodiment, the foamable polyurethane resin composition does not contain as a catalyst at least one of alkylated polyalkylene polyamine, triethylamine, N'',N''-pentamethyldiethylenetriamine, N,N,N'-trimethyl aminoethyl-ethanolamine, and a urethane catalyst.

In an embodiment of the present invention, the foamable urethane resin composition contains an amphiphilic catalyst as the catalyst other than the trimerization catalyst. The content of the amphiphilic catalyst is 1.5 parts by weight or less, preferably 1.0 parts by weight or less, and more preferably 0.5 parts by weight or less, per 100 parts by weight of the urethane resin. The lower limit of the content of the amphiphilic catalyst is not particularly limited, and is preferably 0 parts by weight or more, per 100 parts by weight of the urethane resin.

The amphiphilic catalyst is expected to allow water and the urethane resin to blend well, thereby facilitating the hydrolysis of the isocyanurates.

The "amphiphilic catalyst" in the present invention refers to a catalyst with a water content of 4.0% or more in the following test.

The water content is a value obtained as follows: 10 g of trischloropropyl)phosphate (TMCPP), 1 g of water, and 1 g of a catalyst are mixed, and the mixture is sufficiently allowed to stand, followed by measuring the water content in the TMCPP layer by the Karl Fischer's method.

The catalyst can be used singly, or in a combination of two or more.

5. Foaming Agent

The foaming agent promotes foaming of urethane resin. Examples of foaming agents include water; low-boiling hydrocarbons, such as propane, butane, pentane, hexane, heptane, cyclopropane, cyclobutane, cyclopentane, cyclohexane, and cycloheptane; chlorinated aliphatic hydrocarbon compounds, such as dichloroethane, propylchloride, isopropylchloride, butylchloride, isobutylchloride, pentylchloride, and isopentylchloride; fluorine compounds, such as $CHF_3$, $CH_2F_2$, and $CH_3F$; hydrochlorofluorocarbon compounds, such as trichloromonofluoromethane, trichlorotrifluoroethane, dichloromonofluoroethane (e.g., HCFC141b (1,1-dichloro-1-fluoroethane), HCFC22 (chlorodifluoromethane), and HCFC142b (1-chloro-1,1-difluoroethane)); hydrofluorocarbons, such as HFC-245fa (1,1,1,3,3-pentafluoropropane) and HFC-365mfc (1,1,1,3,3-pentafluorobutane); ether compounds, such as diisopropyl ether; organic physical foaming agents, such as mixtures of these compounds; and inorganic physical foaming agents, such as nitrogen gas, oxygen gas, argon gas, and carbon dioxide gas.

The amount of the foaming agent is not particularly limited, but is preferably within the range of 0.1 to 30 parts by weight, per 100 parts by weight of the urethane resin. The amount of the foaming agent is more preferably within the range of 0.1 to 18 parts by weight, even more preferably 0.5 to 18 parts by weight, and most preferably 1 to 10 parts by weight, per 100 parts by weight of the urethane resin.

Water within the range of 0.1 parts by weight or more promotes foaming, reducing the density of the obtained molded product. Water within the range of 30 parts by weight or less can avoid a case where the composition fails to foam, thereby not foaming a foam.

These foaming agents can be used singly, or in a combination of two or more.

6. Flame Retardant

The flame retardant contains at least one member selected from red phosphorus, phosphoric acid esters, phosphate-containing flame retardants, bromine-containing flame retardants, boron-containing flame retardants, antimony-containing flame retardants, and metal hydroxides. Preferably, the flame retardant contains red phosphorus and at least one member selected from phosphoric acid esters, phosphate-containing flame retardants, bromine-containing flame retardants, boron-containing flame retardants, antimony-containing flame retardants, and metal hydroxides.

For the flame retardant, commercially available products can suitably be selected for use.

There is no limitation on the red phosphorus used in the present invention, and a commercially available product may be suitably selected for use.

The amount of the red phosphorus for use is preferably within the range of 2 to 30 parts by weight, more preferably 3.5 to 20 parts by weight, and even more preferably 6.0 to 18 parts by weight, per 100 parts by weight of the urethane resin.

Red phosphorus within the range of 3.5 parts by weight or more maintains the self-extinguishing property of the flame-retardant urethane resin composition, while red phosphorus within the range of 20 parts by weight or less does not impede foaming of the flame-retardant urethane resin composition.

The phosphoric acid esters for use in the present invention are not particularly limited. A monophosphoric acid ester, a condensed phosphoric acid ester, or the like is preferably used.

Examples of monophosphoric acid esters include, but are not particularly limited to, trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate, resorcinol bis(diphenylphosphate), bisphenol A bis(diphenyl phosphate), phosphaphenanthrene, and trischloropropyl)phosphate.

Examples of condensed phosphoric acid esters include, but are not particularly limited to, trialkyl polyphosphate, resorcinol polyphenyl phosphate, resorcinol poly(di-2,6-xylyl)phosphate (produced by Daihachi Chemical Industry Co., Ltd., trade name: PX-200), hydroquinone poly(2,6-xylyl)phosphate, and condensation products thereof, such as condensed phosphoric acid esters.

Examples of commercially available condensed phosphoric acid esters include resorcinol polyphenyl phosphate (trade name: CR-733S), bisphenol A polycresyl phosphate (trade name: CR-741), aromatic condensed phosphoric acid ester (trade name: CR747), resorcinol polyphenyl phosphate (produced by Adeka Co. Ltd., trade name: ADK Stab PFR), and bisphenol A polycresyl phosphate (trade names: FP-600 and FP-700).

Of those listed above, monophosphoric acid esters are preferable for use, and tris(β-chloropropyl) phosphate is more preferable for use, because they are highly effective in reducing the viscosity of the composition before curing and the initial calorific value.

The phosphoric acid esters may be used singly, or in a combination of two or more.

The amount of the phosphoric acid ester for use is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

A phosphoric acid ester within the range of 1.5 parts by weight or more prevents the breakage of dense residues that are formed when a molded product formed from the foamable polyurethane resin composition is exposed to heat given off by fire. A phosphoric acid ester within the range of 52 parts by weight or less does not impede foaming of the foamable polyurethane resin composition.

The phosphate-containing flame retardants for use in the present invention contain a phosphoric acid. Examples of the phosphoric acid for use in the phosphate-containing flame retardants include, but are not particularly limited to, various phosphoric acids, such as monophosphoric acid, pyrophosphoric acid, polyphosphoric acid, and combinations thereof.

Examples of phosphate-containing flame retardants include phosphates, which are salts of various phosphoric acids with at least one metal or compound selected from metals belonging to Groups IA to IVB on the periodic table; ammonia; aliphatic amines; and aromatic amines. Examples of metals belonging to Groups IA to IVB on the periodic table include lithium, sodium, calcium, barium, iron (II), iron (III), and aluminum.

Examples of aliphatic amines include methylamine, ethylamine, diethylamine, triethylamine, ethylenediamine, and piperazine.

Examples of aromatic amines include pyridine, triazine, melamine, and ammonium.

The phosphate-containing flame retardants may be subjected to a known treatment for improving waterproofness, such as treatment with a silane coupling agent or coating with a melamine resin. A known foaming auxiliary agent, such as melamine or pentaerythritol, may also be added to the phosphate-containing flame retardants.

Specific examples of phosphate-containing flame retardants include monophosphates, pyrophosphates, and polyphosphates.

Examples of monophosphates include, but are not particularly limited to, ammonium salts, such as ammonium phosphate, ammonium dihydrogen phosphate, and diammonium hydrogen phosphate; sodium salts, such as monosodium phosphate, disodium phosphate, trisodium phosphate, monosodium phosphite, disodium phosphite, and sodium hypophosphite; potassium salts, such as monopotassium phosphate, dipotassium phosphate, tripotassium phosphate, monopotassium phosphite, dipotassium phosphite, and potassium hypophosphite; lithium salts, such as monolithium phosphate, dilithium phosphate, trilithium phosphate, monolithium phosphite, dilithium phosphite, and lithium hypophosphite; barium salts, such as barium dihydrogen phosphate, barium hydrogen phosphate, tribarium phosphate, and barium hypophosphite; magnesium salts, such as magnesium monohydrogen phosphate, magnesium hydrogen phosphate, trimagnesium phosphate, and magnesium hypophosphite; calcium salts, such as calcium dihydrogen phosphate, calcium hydrogen phosphate, tricalcium phosphate, and calcium hypophosphite; and zinc salts, such as zinc phosphate, zinc phosphite, and zinc hypophosphite.

Examples of polyphosphates include, but are not particularly limited to, ammonium polyphosphate, piperazine polyphosphate, melamine polyphosphate, ammonium polyphosphate amide, and aluminum polyphosphate.

Of these, monophosphates are preferable for use, and ammonium dihydrogen phosphate is more preferable for use, to improve the self-extinguishing property of the phosphate-containing flame retardant.

The phosphate-containing flame retardants may be used singly, or in a combination of two or more.

The amount of the phosphate-containing flame retardant for use in the present invention is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

The bromine-containing flame retardants for use in the present invention are not particularly limited, as long as the retardants are a compound containing bromine in the molecular structure. Examples thereof include aromatic brominated compounds.

Specific examples of aromatic brominated compounds include monomeric organic bromine compounds, such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis(pentabromophenoxy)ethane, ethylene-bis (tetrabromophthalimide), and tetrabromobisphenol brominated polycarbonates, such as polycarbonate oligomers produced by using brominated bisphenol A as a starting material, and copolymers of a polycarbonate oligomer with bisphenol brominated epoxy compounds, such as diepoxy compounds produced by reacting brominated bisphenol A with epichlorohydrin, and monoepoxy compounds obtained by reacting brominated phenols with epichlorohydrin; poly (brominated benzyl acrylate); brominated polyphenylene ethers; condensation products of brominated bisphenol A, cyanuric chloride, and brominated phenol; brominated polystyrenes, such as brominated(polystyrene), poly(brominated styrene), and crosslinked brominated polystyrene; and halogenated bromine compound polymers, such as crosslinked or non-crosslinked brominated poly(-methylstyrene).

From the standpoint of controlling the calorific value at the initial stage of combustion, brominated polystyrene, hexabromobenzene, and the like are preferable, and hexabromobenzene is more preferable.

The bromine-containing flame retardants may be used singly, or in a combination of two or more.

The amount of the bromine-containing flame retardant for use in the present invention is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

Examples of the boron-containing flame retardants for use in the present invention include borax, boron oxides, boric acids, and borates.

Examples of boron oxides include diboron trioxide, boron trioxide, diboron dioxide, tetraboron trioxide, and tetraboron pentoxide.

Examples of borates include borates of alkali metals, alkaline earth metals, elements in Groups 4, 12, and 13 on the periodic table, and ammonium.

Specific examples thereof include alkali metal borates, such as lithium borate, sodium borate, potassium borate, and cesium borate; alkaline earth metal borates, such as magnesium borate, calcium borate, and barium borate; zirconium borate; zinc borate; aluminum borate; and ammonium borate.

The boron-containing flame retardant for use in the present invention is preferably a borate, and more preferably zinc borate.

The boron-containing flame retardants may be used singly, or in a combination of two or more. The amount of the boron-containing flame retardant for use in the present invention is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

Examples of the antimony-containing flame retardants for use in the present invention include antimony oxides, antimonates, and pyroantimonates.

Examples of antimony oxides include antimony trioxide and antimony pentoxide.

Examples of antimonates include sodium antimonate and potassium antimonate.

Examples of pyroantimonates include sodium pyroantimonate and potassium pyroantimonate.

The antimony-containing flame retardant for use in the present invention is preferably an antimony oxide.

The antimony-containing flame retardants may be used singly, or in a combination of two or more.

The amount of the antimony-containing flame retardant is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

Examples of metal hydroxides for use in the present invention include magnesium hydroxide, calcium hydroxide, aluminum hydroxide, iron hydroxide, nickel hydroxide, zirconium hydroxide, titanium hydroxide, zinc hydroxide, copper hydroxide, vanadium hydroxide, and tin hydroxide.

The metal hydroxides may be used singly, or in a combination of two or more.

The amount of the metal hydroxide for use is preferably within the range of 1.5 to 52 parts by weight, more preferably 1.5 to 20 parts by weight, even more preferably 2.0 to 15 parts by weight, and most preferably 2.0 to 10 parts by weight, per 100 parts by weight of the urethane resin.

The total amount of the flame retardant for use in the present invention is preferably within the range of 4.5 to 70 parts by weight, more preferably 4.5 to 40 parts by weight, and even more preferably 4.5 to 30 parts by weight, per 100 parts by weight of the urethane resin.

The flame retardant within the range of 4.5 parts by weight or more prevents the breakage of dense residues that are famed when a molded product formed from the foamable polyurethane resin composition is exposed to heat given off by fire. The flame retardant within the range of 70 parts by weight or less does not impede foaming of the foamable polyurethane resin composition.

In a preferable embodiment, the foamable polyurethane resin composition contains 50 to 85 parts by weight of an aromatic polyisocyanate, 0.1 to 10 parts by weight of a foam stabilizer, 0.6 to 10 parts by weight of a catalyst, 0.1 to 30 parts by weight of a foaming agent, and 4.5 to 70 parts by weight of a flame retardant, per 100 parts by weight of a urethane resin containing an aromatic polyisocyanate and a polyol. The flame retardant contains 3 to 18 parts by weight of red phosphorus and 1.5 to 52 parts by weight of at least one member selected from phosphoric acid esters, phosphate-containing flame retardants, bromine-containing flame retardants, boron-containing flame retardants, antimony-containing flame retardants, and metal hydroxides. In this embodiment, the catalyst is present preferably in an amount of 3.5 to 10 parts by weight. The flame retardant is present preferably in an amount of 4.5 to 52 parts by weight, more preferably 4.5 to 30 parts by weight, and preferably 1.5 to 9 parts by weight. The at least one member selected from phosphoric acid esters, phosphate-containing flame retardants, bromine-containing flame retardants, boron-containing flame retardants, antimony-containing flame retardants, and metal hydroxides is preferably a boron-containing flame retardant.

7. Other Components

The foamable polyurethane resin composition may further contain an inorganic filler. Examples of inorganic fillers include, but are not particularly limited to, silica, diatomaceous earth, alumina, titanium oxide, calcium oxide, magnesium oxide, iron oxide, tin oxide, antimony oxide, ferrites, basic magnesium carbonate, calcium carbonate, magnesium carbonate, zinc carbonate, barium carbonate, dawsonite, hydrotalcite, calcium sulfate, barium sulfate, gypsum fiber, calcium silicate, talc, clay, mica, wollastonite, montmorillonite, bentonite, activated white clay, sepiolite, imogolite, sericite, glass fibers, glass beads, silica balloon, aluminum nitride, boron nitride, silicon nitride, carbon black, graphite, carbon fibers, carbon balloon, charcoal powder, various metal powders, potassium titanate, magnesium sulfate, lead zirconate titanate, aluminum borate, molybdenum sulfide, silicon carbide, stainless steel fibers, various magnetic powders, slag fibers, fly ash, silica alumina fibers, alumina fibers, silica fibers, and zirconia fibers.

The inorganic fillers may be used singly, or in a combination of two or more.

As long as the object of the present invention is not impaired, the foamable polyurethane resin composition may further optionally contain an antioxidant, such as a phenol antioxidant, an amine antioxidant, or a sulfur antioxidant; an auxiliary component, such as a heat stabilizer, a metal toxicity inhibitor, an antistatic agent, a stabilizer, a cross-linking agent, a lubricant, a softening agent, a pigment, and a tackifier resin; and a tackifier, such as polybutene, and petroleum resin.

After the components described in sections 1 to 7 above are mixed, the foamable polyurethane resin composition cures through a reaction, changing its viscosity over time. Thus, before use, the foamable polyurethane resin composition is divided into two or more components to prevent the composition from curing through a reaction. When the foamable polyurethane resin composition is used, the divided two or more components of the foamable polyurethane resin composition are brought together to obtain the foamable polyurethane resin composition.

The foamable polyurethane resin composition may be divided into two or more components such that the divided individual two or more components of the composition do not begin to cure, but begin to cure when they are mixed.

The foamable polyurethane resin composition may be cured by mixing at room temperature, or each component may be heated beforehand.

The foam stabilizer, catalyst, foaming agent, and flame retardant may be mixed with either the polyol or the aromatic polyisocyanate, or may be provided separately from the polyol and the aromatic polyisocyanate. However, the polyol, foam stabilizer, catalyst, foaming agent, and flame retardant are preferably provided as a polyol premix containing the polyol and these components. The other components in section 7 above may also be mixed with either the polyol or the aromatic polyisocyanate, or provided separately from the polyol and the aromatic polyisocyanate. However, the other components are preferably contained in the polyol premix.

The foamable polyurethane resin composition that is famed by mixing the polyol, aromatic polyisocyanate, foam stabilizer, catalyst, foaming agent, and flame retardant isocyanate, or preferably by mixing the aromatic polyisocyanate with the polyol premix containing the polyol, foam stabilizer, catalyst, foaming agent, and flame retardant, foams and cures to become a polyurethane foam.

The polyurethane foam of the present invention has a ratio of the maximum peak intensity ratio (P1) after moist heat treatment of the foam for one week at a temperature of 80° C. and a humidity of 85% to the maximum peak intensity ratio (P2) of the foam before the moist heat treatment of 85% or more (P1/P2×100). The ratio is preferably 89% or more, and more preferably 90% or more.

The ratio (P1/P2×100) can be used as an index for flame retardancy, and heat and humidity resistance of the flame-retardant rigid polyurethane foam.

The moist heat treatment at a temperature of 80° C. and a humidity of 85% is an accelerated test of moist heat treatment, which is commonly used in the architecture field, and a 2-week moist heat treatment at a temperature of 80° C. and a humidity of 85% corresponds to a one-year test at a typical temperature and humidity.

IR was measured at a position 5 to 10 mm from the surface of the polyurethane foam to avoid the surface from which heat is easily released, and to measure the foam at a position at which its composition is stable. The maximum peak value of 1390 to 1430 cm$^{-1}$ indicates the isocyanurate, and the maximum peak value of 1500 to 1520 cm$^{-1}$ indicates the aromatic ring.

In this specification, the ratio of the maximum peak value of 1390 to 1430 cm$^{-1}$ to the maximum peak value of 1500 to 1520 cm$^{-1}$ (the maximum peak value of 1390 to 1430 cm$^{-1}$/the maximum peak value of 1500 to 1520 cm$^{-1}$) with the average intensity of 1900 to 2000 cm$^{-1}$ adjusted to zero is referred to as isocyanurate ratio (or simply "nurate ratio"). Unexpectedly, this isocyanurate ratio can be used as an index for evaluating the heat and humidity resistance of flame retardancy of flame-retardant rigid polyurethane foams. When the isocyanurate ratio after 1 week of moist heat treatment at a temperature of 80° C. and a humidity of 85% is 85% or more relative to the isocyanurate ratio before the moist heat treatment, the flame-retardant rigid polyurethane foam has excellent heat and humidity resistance of flame retardancy.

When the isocyanurate ratio after 1 week of moist heat treatment at a temperature of 80° C. and a humidity of 85% is less than 85% relative to the isocyanurate ratio before the moist heat treatment, the flame retardancy after exposure to heat and humidity becomes poor.

The fire resistance of the flame-retardant rigid polyurethane foam of the present invention can be evaluated by a cone calorimeter test in accordance with a test method of ISO-5660. Specifically, in this fire resistance test, a polyurethane foam formed from a foamable polyurethane resin composition is cut into pieces with a length of 10 cm, a width of 10 cm, and a thickness of 5 cm, thereby preparing samples for the cone calorimeter test. Next, the samples for the cone calorimeter test are heated for 20 minutes at a radiant heat intensity of 50 kW/m$^2$, and the gross calorific value is measured with a cone calorimeter in accordance with the test method of ISO-5660.

In this specification, "non-flammability" satisfies all of the following conditions (1) to (3): (1) the gross calorific value within 20 minutes from the start of heating at a radiant heat intensity of 50 kW/m$^2$ is 8 MJ/m$^2$ or less, (2) the heat release rate in excess of 200 kW/m$^2$ does not continue more than 10 seconds within 20 minutes after the start of heating, and (3) deformation, such as cracks and holes, that can be hazardous for fire control does not occur within 20 minutes from the start of heating.

The use of the flame-retardant rigid polyurethane foam of the present invention is not particularly limited. The foam is typically used in filling up openings or gaps in buildings. The team "buildings" as used here includes any structures that are part of buildings, such as building structural materials for walls, ceilings, roofs, and floors; as well as fittings, such as windows (e.g., double sliding windows, casement windows, and double-hung windows), shoji (a Japanese sliding window or door), tobira (i.e. a door), to (a Japanese door), fusuma (a Japanese sliding door), and transoms. The term "openings" refers to any openings found in a building, including joints between the structural materials of a building and holes in one structural material. Among the openings, a "gap" refers to an opening found between two oppositely facing components or portions, such as those between a structural material and a structural material, between a structural material and a fitting, between a fitting and a fitting, and between a structural material or a fitting and furniture (e.g., a kitchen sink).

The flame-retardant rigid polyurethane foam of the present invention is preferably formed such that a foamable polyurethane resin composition is directly sprayed onto an object such as an opening or gap of a building, and allowed to foam on the object.

The flame-retardant rigid polyurethane foam can fill an opening or gap in a building by directly filling the opening or gap with the foamable polyurethane resin composition. However, the composition may also be poured into a container, such as a mold, to form it into a size that will fit an opening or gap in a building (length, width, and thickness) or may be discharged from a mixing container into another place, and the resulting polyurethane foam is cut into pieces with a predetermined size (length, width, and thickness) to fill an opening or gap in a building.

The flame-retardant rigid polyurethane foam obtained by foaming and curing the foamable polyurethane resin composition is excellent in waterproofness, airtightness, and fire resistance. Thus, the flame-retardant rigid polyurethane foam can effectively prevent water, smoke, flames, gas generated by combustion, etc., from entering through openings or gaps in buildings. The following Examples describe the present invention in more detail. However, the present invention is not limited to these Examples.

EXAMPLES

Production Example 1: Production of Foamable Polyurethane Resin Composition and Flame-Retardant Rigid Polyurethane Foam In accordance with the formulations shown in Table 1, the foamable polyurethane resin compositions of Examples 1 to 7 and Comparative Examples 1 and 2 were prepared in two separate components, i.e., (1) a polyol premix and (2) an aromatic polyisocyanate. The following are the details of each component in Table 1.
(1) Polyol Premix
  Polyol
p-Phthalic acid polyester polyol (Kawasaki Kasei Chemicals Ltd., trade name: MAXIMOL RLK-087, hydroxy value=200 mgKOH/g)
  Foam Stabilizer
Polyalkyleneglycol-based foam stabilizer (Dow Corning Toray Co., Ltd., trade name: SH-193)
  Catalyst
Trimerization catalyst (Tosoh Corporation, trade name: TOYOCAT® TRX)
Trimerization catalyst (Air Products and Chemicals, Inc., trade name: DABCO® K-15)
Trimerization catalyst (San-Apro Ltd., trade name: U-CAT 18X)

Tertiary Amine (alkylated polyalkylene polyamine) (Tosoh Corporation, trade name: TOYOCAT®-TT)
Urethane Catalyst of Tertiary Amine (an imidazole-based compound) (San-Apro Ltd., trade name: U-CAT 202)
Tertiary Amine (a mixture of 1,2-dimethylimidazole and ethylene glycol) (Tosoh Corporation, trade name: TOYOCAT®-DM70)
Tertiary Amine (triethylene diamine) (Tosoh Corporation, trade name: TEDA-L33)

Foaming Agent

Water

HFC HFC-365mfc (1,1,1,3,3-pentafluorobutane, Central Glass Co., Ltd.) and HFC-245fa (1,1,1,3,3-pentafluoropropane, Nippon Solvay K.K.), the mixture ratio HFC-365mfc: HFC-245fa=7:3, "HFC")

Flame Retardant

Tris(β-chloropropyl)phosphate (Daihachi Chemical Industry Co., Ltd., trade name: TMCPP, "TMCPP")
Red Phosphorus (Rin Kagaku Kogyo Co., Ltd., trade name: Nova Excel 140)

Zinc Borate (Hayakawa & Co., Ltd., Trade Name: Firebrake ZB)

Inorganic Filler

Wollastonite ($SiO_2 \cdot CaO$) (Kinsei Matec Co., Ltd., trade name: SH-1250) Fumed Silica (Nippon Aerosil, trade name: Aerosil R976S)

(2) Aromatic Polyisocyanate 4,4'-Diphenylmethane diisocyanate (4,4'-MDI) (Wanhua Chemical Japan, trade name: PM200)

In accordance with the formulations shown in Table 1 below, (1) polyol premix ingredients were weighed into a 1000-mL polypropylene beaker, and mixed by hand at 25° C. for 1 minute to stir the mixture. (2) An aromatic polyisocyanate was added to the kneaded product of (1) the stirred polyol premix ingredients, and stirred with a handheld electric mixer for about 10 seconds, thereby preparing a foamable polyurethane resin composition. The obtained foamable polyurethane resin composition lost its fluidity over time, thereby obtaining a flame-retardant rigid polyurethane foam. The foam was evaluated in accordance with the following criteria, and Table 1 shows the results (the amount of each ingredient is indicated by part by weight per 100 parts by weight of the urethane resin).

Test Example 1: IR Measurement

Pieces of the flame-retardant rigid polyurethane foams of Examples 1 to 7 and Comparative Examples 1 and 2 were cut off at a point 5 mm to 10 mm from the surface of the foams, and the obtained samples were placed in an oven, followed by moist heat treatment at a temperature of 80° C. and a humidity of 85%.

The intensity peak value of each sample before moist heat treatment and after 1-week moist heat treatment was measured by the attenuated total reflection (ATR) technique with an IR detector (Varian, FT-IR Microscope 600UMA).

As shown in Tables 1 and 2, the isocyanurate ratio of Example 1 was 1.62 before moist heat treatment and 1.61 after moist heat treatment, and the isocyanurate ratio of Example 2 was 1.60 before moist heat treatment and 1.40 after moist heat treatment. The ratio of the isocyanurate ratio after 1-week moist heat treatment to the isocyanurate ratio before moist heat treatment was 99% in Example 1 and 89% in Example 2.

Table 1 also shows the isocyanurate ratio and the ratio of the isocyanurate ratio after 1-week moist heat treatment to the isocyanurate ratio before moist heat treatment of each of Examples 3 to 7.

Comparatively, the isocyanurate ratio of Comparative Example 1 was 1.72 before moist heat treatment and 1.44 after moist heat treatment, and the isocyanurate ratio of Comparative Example 2 was 1.71 before moist heat treatment and 1.42 after moist heat treatment. The ratio of the isocyanurate ratio after 1-week moist heat treatment to the isocyanurate ratio before moist heat treatment was 84% in Comparative Example 1 and 83% in Comparative Example 2.

Test Example 2: Fire Resistance Test

The flame-retardant rigid polyurethane foams of Examples 1 to 7 were subjected to moist heat treatment at a temperature of 80° C. and a humidity of 85% for 1 week or 2 weeks to prepare samples. The flame-retardant rigid polyurethane foams of Comparative Examples 1 and 2 were subjected to moist heat treatment at a temperature of 80° C. and a humidity of 85% for 1 week to prepare samples. From these samples, samples with a size of 10 cm×10 cm×5 cm were cut out for use in a cone calorimeter test, and the maximum heat release rate and gross calorific value were measured by heating these samples at a radiant heat intensity of 50 $kW/m^2$ for 20 minutes in accordance with ISO-5660.

This measurement method is stipulated by the General Building Research Corporation of Japan, which is a public institution set forth in Article 108 (2) of the Enforcement Ordinance of Building Standards Act, as a test method that corresponds to the standards of a cone calorimeter method. The measurement method is based on a test method of ISO-5660.

A gross calorific value of 8 $MJ/m^2$ or less in a cone calorimeter after heating for 20 minutes is considered "pass." Herein, more than 8 $MJ/m^2$ after heating for 20 minutes is "fail," and 8 $MJ/m^2$ or less after heating for 20 minutes is "pass."

In the overall evaluation of the fire resistance test, when the result of the test by the cone calorimeter method was pass only in 1-week moist heat treatment, the sample was rated B. When the test result was pass in both 1-week moist heat treatment and 2-week moist heat treatment, the sample was rated A. When the test result was fail even in 1-week moist heat treatment, the sample was rated C. As shown in Table 1, Examples 1, 3, 5, and 6 were rated A, and Examples 2, 4, and 7 were rated B, with Comparative Examples 1 and 2 rated C in the overall evaluation.

Test Example 3: Measurement of Water Content

Among the ingredients above, alkylated polyalkylene polyamine (tertiary amine) (Tosoh Corporation, trade name: TOYOCAT®-TT), the urethane catalyst of a tertiary amine (an imidazole-based compound, San-Apro Ltd., trade name: U-CAT 202), the tertiary amine (a mixture of 1,2-dimethylimidazole and ethylene glycol, Tosoh Corporation, trade name: TOYOCAT®-DM70), and the tertiary amine (triethylene diamine, Tosoh Corporation, trade name: TEDA-L33) were measured for water content in accordance with the following method.

First, 1 g of each catalyst, 10 g of TMCPP, and 1 g of water were mixed, and allowed to sufficiently stand. Thereafter, the water content of the TMCPP layer was measured by the Karl Fischer technique.

The results were as follows: TOYOCAT®-TT 4.3%, U-CAT 202 4.5%, TOYOCAT®-DM70 3.7%, and TEDA-L33 3.6%.

TABLE 1

| | | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| Formulation | Isocyanate | PM200 | 73.2 | 73.2 | 73.2 | 73.2 | 7.32 | 73.2 | 73.2 | 73.2 | 73.2 |
| | Polyol | RLK-087 | 26.7 | 26.7 | 26.7 | 26.7 | 26.7 | 26.7 | 26.7 | 26.7 | 26.7 |
| | Foam Stabilizer | SH-193 | 1.9 | 1.9 | 1.9 | 1.9 | 1.9 | 1.9 | 1.9 | 1.9 | 1.9 |
| | Catalyst | TOYOCAT-TRX | 1.4 | 1.4 | 1.4 | 1.4 | 0.7 | 1.4 | 0.7 | 1.4 | 1.4 |
| | | DABCO K-15 | 1.0 | 1.0 | 1.0 | 1.0 | | 1.0 | | | |
| | | U-CAT 18X | | | | | 1.0 | | 1.0 | 1.0 | 1.0 |
| | | TOTOCAT-TT | 1.0 | | | 1.0 | 1.0 | 0.5 | 1.5 | 1.0 | 1.0 |
| | | U-CAT 202 | | 1.0 | | | | | | 0.9 | 0.9 |
| | | TOYOCAT-DM70 | 2.4 | 2.4 | 2.4 | | 1.2 | 1.8 | 2.4 | 1.5 | 1.5 |
| | | TEDA-133 | | | 1.0 | 2.4 | | | | | |
| | Foaming Agent | Water | 0.2 | 0.2 | 0.2 | 0.2 | 0.2 | 0.2 | 0.2 | 0.2 | 0.2 |
| | | HFC | 15.0 | 15.0 | 15.0 | 15.0 | 15.0 | 15.0 | 15.0 | 15.0 | 15.0 |
| | Flame Retardant | TMCPP | 12.0 | 12.0 | 12.0 | 12.0 | 12.0 | 12.0 | 12.0 | 12.0 | 12.0 |
| | | Nova Excel 140 | 8.0 | 8.0 | 6.0 | 6.0 | 8.0 | 8.0 | 8.0 | 8.0 | 8.0 |
| | | FIRE BREAK ZB | 3.0 | 3.0 | 3.0 | 3.0 | 3.0 | 3.0 | 3.0 | 3.0 | 3.0 |
| | Inorganic Filler | SH-1250 | 3.5 | 3.5 | 3.5 | 3.5 | 3.5 | 3.5 | 3.5 | 3.5 | 3.5 |
| | | Aerosil R976S | 0.5 | 0.5 | 0.5 | 0.5 | 0.5 | 0.5 | 0.5 | 0.5 | 0.5 |
| Evaluation | IR Measurement | Isocyanurate Ratio | 1.62 | 1.60 | 1.61 | 1.50 | 1.51 | 1.63 | 1.52 | 1.72 | 1.71 |
| | | | 1.61 | 1.42 | 1.59 | 1.36 | 1.45 | 1.60 | 1.36 | 1.44 | 1.42 |
| | | Change in Isocyanurate Ratio | 99% | 89% | 99% | 91% | 96% | 98% | 89% | 84% | 83% |
| | Non-flammability | Non-flammability, 80° C., 85%, 1-week Moist Heat Treatment | PASS | PASS | PASS | PASS | PASS | PASS | PASS | FAIL | FAIL |
| | | Non-flammability, 80° C., 85%, 2-week Moist Heat Treatment | PASS | FAIL | PASS | FAIL | PASS | PASS | FAIL | —* | —* |
| | Heat and Humidity Resistance and Non-flammability | Evaluation | A | B | A | B | A | A | B | C | C |

*Not measured

TABLE 2

| | IR Measurement | | | | | | Non-flammability | | |
|---|---|---|---|---|---|---|---|---|---|
| | Before Moist Heat Treatment | | | After 1-week Moist Heat Treatment (80° C. 85%) | | | Gross Calorific Value (MJ/m²) | | |
| | (1) | (2) | | (1) | (2) | Change | Before | After | |
| | Aromatic Series 1500-1520 | Nurate 1390-1420 | Nurate Ratio (2)/(1) | Aromatic Series 1500-1520 | Nurate 1390-1420 | Nurate Ratio (2)/(1) | in Nurate Ratio (%) | Moist Heat Treatment | Moist Heat Treatment | Evaluation |
| Sample | | | | | | | | | | |
| Example 1 | 0.14 | 0.23 | 1.62 | 0.14 | 0.23 | 1.62 | 100 | 7.32 | 7.70 | PASS |
| Example 2 | 0.14 | 0.22 | 1.60 | 0.14 | 0.20 | 1.42 | 89 | 8.22 | 7.35 | PASS |
| Comparative Example 1 | 0.14 | 0.24 | 1.72 | 0.14 | 0.20 | 1.44 | 83 | 5.47 | 8.93 | FAIL |
| Comparative Example 2 | 0.14 | 0.24 | 1.71 | 0.14 | 0.20 | 1.42 | 83 | 7.84 | 10.01 | FAIL |

Embodiments and examples of the present invention are specifically described above; however, the present invention is not limited to these embodiments, and various modifications may be made based on the technical concept of the present invention. The present invention may also include the following subject matter.

Item 1.

A flame-retardant rigid polyurethane foam comprising a flame retardant, the foam having a ratio of the maximum peak intensity ratio (P1) after moist heat treatment of the foam for one week at a temperature of 80° C. and a humidity of 85% to the maximum peak intensity ratio (P2) of the foam before the moist heat treatment of 85% or more (P1/P2×100), the P1 and P2 each referring to a ratio of the maximum peak intensity of 1390 to 1430 $cm^{-1}$ to the maximum peak intensity of 1500 to 1520 $cm^{-1}$ when an infrared absorption spectrum is measured at a position 5 to 10 mm from the surface of the foam, and the average intensity of 1900 to 2000 cm$^{-1}$ is adjusted to zero.

Item 2.

The flame-retardant rigid polyurethane foam according to Item 1, comprising, as the flame retardant, at least one member selected from the group consisting of red phosphorus, phosphoric acid esters, phosphate-containing flame retardants, bromine-containing flame retardants, boron-containing flame retardants, antimony-containing flame retardants, and metal hydroxides.

Item 3.

The flame-retardant rigid polyurethane foam according to Item 1 or 2, comprising
a trimerization catalyst and
a catalyst other than the trimerization catalyst,
the trimerization catalyst being present in an amount of 0.6 to 10 parts by weight per 100 parts by weight of a urethane resin,
the catalyst other than the trimerization catalyst being present in an amount of 3 parts by weight or less per 100 parts by weight of the urethane resin.

Item 4.

The flame-retardant rigid polyurethane foam according to any one of Items 1 to 3, comprising a tertiary amine as the catalyst other than the trimerization catalyst, the tertiary amine being present in an amount of 3 parts by weight or less per 100 parts by weight of the urethane resin.

Item 5.

A foamable polyurethane resin composition comprising
a polyol,
a polyisocyanate,
a foam stabilizer,
a catalyst,
a foaming agent,
a flame retardant, and
a trimerization catalyst and a catalyst other than the trimerization catalyst as a catalyst,
the trimerization catalyst being present in an amount of 0.6 to 10 parts by weight per 100 parts by weight of a urethane resin,
a tertiary amine being present as the catalyst other than the trimerization catalyst in an amount of 3 parts by weight or less per 100 parts by weight of the urethane resin.

Item 6.

The foamable polyurethane resin composition according to Item 5, comprising, as the flame retardant, at least one member selected from the group consisting of red phosphorus, phosphoric acid esters, phosphate-containing flame retardants, bromine-containing flame retardants, boron-containing flame retardants, antimony-containing flame retardants, and metal hydroxides.

The invention claimed is:

1. A flame-retardant rigid polyurethane foam comprising a urethane resin, a flame retardant, trimerization catalysts, and a catalyst other than the trimerization catalysts,
the catalyst other than the trimerization catalysts comprising 1,2-dimethylimidazole, and
the trimerization catalysts comprising a quaternary ammonium salt and a carboxylic acid potassium salt, wherein the quaternary ammonium salt is tetramethyl ammonium salt, tetraethyl ammonium salt, tetraphenyl ammonium salt, or triethylmethyl ammonium salt,
the foam having a ratio of the maximum peak intensity ratio P1 after moist heat treatment of the foam for one week at a temperature of 80° C. and a humidity of 85% to the maximum peak intensity ratio P2 of the foam before the moist heat treatment of 85% or more, as calculated by the equation P1/P2×100,
P1 and P2 each referring to a ratio of the maximum peak intensity of 1390 to 1430 cm$^{-1}$ to the maximum peak intensity of 1500 to 1520 cm$^{-1}$ when an infrared absorption spectrum is measured at a position 5 to 10 mm from the surface of the foam, and the average intensity of 1900 to 2000 cm$^{-1}$ is adjusted to zero.

2. The flame-retardant rigid polyurethane foam according to claim 1, comprising, as the flame retardant, at least one member selected from the group consisting of red phosphorus, phosphoric acid esters, phosphate-containing flame retardants, bromine-containing flame retardants, boron-containing flame retardants, antimony-containing flame retardants, and metal hydroxides.

3. The flame-retardant rigid polyurethane foam according to claim 1, wherein
the trimerization catalysts being present in an amount of 0.6 to 10 parts by weight per 100 parts by weight of the urethane resin,
the catalyst other than the trimerization catalysts being present in an amount of 3 parts by weight or less per 100 parts by weight of the urethane resin.

4. The flame-retardant rigid polyurethane foam according to claim 1,
the catalyst other than the trimerization catalysts being present in an amount of 3 parts by weight or less per 100 parts by weight of the urethane resin, and
optionally, the catalyst other than the trimerization catalysts further comprising a tertiary amine other than 1,2-dimethylimidazole.

5. A foamable polyurethane resin composition comprising
a polyol,
a polyisocyanate,
a foam stabilizer,
a foaming agent,
a flame retardant, and
trimerization catalysts and a catalyst other than the trimerization catalysts, the catalyst other than the trimerization catalysts including 1,2-dimethylimidazole, and the trimerization catalysts including a quaternary ammonium salt and a carboxylic acid potassium salt, wherein the quaternary ammonium salt is tetramethyl ammonium salt, tetraethyl ammonium salt, tetraphenyl ammonium salt, or triethylmethyl ammonium salt,
the foamable polyurethane resin composition comprising, based on 100 parts by weight of a urethane resin prepared from the polyisocyanate compound and the polyol compound,
0.6 to 10 parts by weight of the trimerization catalysts, and
3 parts by weight or less of the catalyst other than the trimerization catalysts.

6. The flame-retardant rigid polyurethane foam according to claim 2, wherein
the trimerization catalysts being present in an amount of 0.6 to 10 parts by weight per 100 parts by weight of the urethane resin,
the catalyst other than the trimerization catalysts being present in an amount of 3 parts by weight or less per 100 parts by weight of the urethane resin.

7. The flame-retardant rigid polyurethane foam according to claim 2,
the catalyst other than the trimerization catalysts being present in an amount of 3 parts by weight or less per 100 parts by weight of the urethane resin, and optionally, the catalyst other than the trimerization catalysts further comprising a tertiary amine other than 1,2-dimethylimidazole.

8. The flame-retardant rigid polyurethane foam according to claim 3,
the catalyst other than the trimerization catalysts being present in an amount of 3 parts by weight or less per 100 parts by weight of the urethane resin, and
the catalyst other than the trimerization catalysts further comprising a tertiary amine other than 1,2-dimethylimidazole.

9. The flame-retardant rigid polyurethane foam according to claim 6,
the catalyst other than the trimerization catalysts being present in an amount of 3 parts by weight or less per 100 parts by weight of the urethane resin, and
the catalyst other than the trimerization catalysts further comprising a tertiary amine other than 1,2-dimethylimidazole.

10. The flame-retardant rigid polyurethane foam according to claim 1, comprising, as the flame retardant, red phosphorus and at least one member selected from the group consisting of phosphoric acid esters, phosphate-containing flame retardants, bromine-containing flame retardants, boron-containing flame retardants, antimony-containing flame retardants, and metal hydroxides.

* * * * *